United States Patent [19]
Kitch

[11] 3,753,394
[45] Aug. 21, 1973

[54] LIQUID METERING APPARATUS FOR PHOTOGRAPHIC DEVELOPING DEVICE

[75] Inventor: Paul E. Kitch, West Springfield, Mass.

[73] Assignee: The Plastic Coating Corporation, South Hadley, Mass.

[22] Filed: Dec. 18, 1969

[21] Appl. No.: 886,132

[52] U.S. Cl. ............................. 95/94 G, 95/89 G
[51] Int. Cl. .................................... G03d 3/12
[58] Field of Search ...95/89 R, 89 G, 94 G; 222/356, 222/367

[56] References Cited
UNITED STATES PATENTS

| | | | |
|---|---|---|---|
| 1,372,768 | 3/1921 | Mott | 222/56 |
| 1,929,693 | 10/1933 | Jones et al. | 222/57 |
| 2,302,277 | 11/1942 | Von Meister | 95/89 G |
| 2,828,049 | 3/1958 | Midgley | 222/4 |
| 2,989,912 | 6/1961 | Brundage | 95/89 G |

*Primary Examiner*—Samuel S. Matthews
*Assistant Examiner*—Fred L. Braun
*Attorney*—William J. Foley, Martin L. Faigus, John W. Kane, Jr. and John A. Weygandt

[57] ABSTRACT

Liquid metering apparatus for removing a predetermined amount of processing liquid from a reservoir in which the liquid level may vary, and feeding the removed liquid through a conduit to a developing chamber. The metering apparatus includes a cyclically immersed dipper having a chamber therein of a configuration enabling the separation and transfer of a precise amount of liquid from the reservoir even if the level of liquid in the reservoir varies.

7 Claims, 2 Drawing Figures

INVENTOR.
Paul E. Kitch

INVENTOR.
Paul E. Kitch
BY
Stanton T. Hadley
ATTORNEY.

LIQUID METERING APPARATUS FOR PHOTOGRAPHIC DEVELOPING DEVICE

BACKGROUND OF THE INVENTION

1. Field of the Invention

This invention relates to liquid metering apparatus and, more particularly, to apparatus for removing predetermined amounts of liquid from a reservoir in which the liquid level may vary.

2. Brief Description of the Prior Art

In the past, apparatus employing a dipper to transfer liquid from a reservoir to a remote point has been utilized. However, in instances where such apparatus was employed for a metering function, that is, where a measured amount of liquid was to be removed from the reservoir by the dipper, it has always been necessary to maintain the level of liquid in the reservoir at a given height in order to insure that the amount of liquid picked up by the dipper would be consistent. Otherwise, the dipper had to be pivotably mounted as on gimbals and provision made for removing the liquid from the dipper. This required introducing additional mechanical elements into the metering apparatus which it would be desirable to eliminate. However, previous attempts to eliminate such mechanical elements without regulating the level of liquid in the reservoir from which liquid was being metered have not been entirely satisfactory.

In many instances, the above limitations on metering devices have caused special problems because of the types of liquids being metered. For example, where effervescent liquids are to be metered from a reservoir and delivered to a remote point, pumps have often been utilized. However, pumps tend to vapor lock due to the high vapor pressures of the liquids involved. Obviously, this causes severe problems where continuity of supply of the effervescent liquids is an extremely important feature, such as in a continuous process for developing photographic materials in strip form.

It is the chief object and advantage of the present invention to provide a new and improved liquid metering apparatus for removing a predetermined amount of liquid from a reservoir in which the liquid level may vary.

SUMMARY OF THE INVENTION

The invention is a liquid metering apparatus for removing a predetermined amount of liquid from a reservoir in which the liquid level may vary. The apparatus includes a novel dipper adapted to transport liquid, which dipper has a cylindrical chamber therein disposed with its cylindrical axis substantially horizontal and has at least one axially disposed circular opening into the cylindrical chamber. The diameter of the opening is smaller than the diameter of the cylindrical chamber so as to form an annular liquid-retaining groove. Dipper transport means are provided for cyclically immersing the dipper in the reservoir. Conduit means connect the dipper to a remote position outside of the reservoir. The conduit means are adapted to receive liquid from the dipper when the dipper is disposed above the surface of the liquid in the reservoir. The above apparatus accomplishes the removal of a predetermined amount of liquid from the reservoir by the dipper when the dipper is withdrawn from the liquid in the reservoir after immersion therein. In the preferred embodiment the dipper has two axially disposed circular openings into the cylindrical chamber, the openings being disposed at the respective ends of the cylindrical chamber.

The invention also comprises the combination of the above with other elements of equipment for developing a diazotype film to render visible an image thereon. This combination includes a development chamber and means to feed a strip of diazotype film, having a developable image thereon, into and out of the development chamber. Means are provided for maintaining a prescribed minimum vapor pressure of ammonia in the development chamber, which means include liquid evaporator means including heating means disposed in the development chamber, and liquid supply means adapted to feed metered amounts of aqueous ammonia to the liquid evaporator means. The liquid supply means comprise the liquid metering apparatus mentioned above.

The liquid metering apparatus of the invention including the novel dipper provide a means for removing predetermined amounts of liquid from a reservoir even when the liquid level in the reservoir varies. Its use in combination with other elements of equipment for developing a diazotype film results in greater reliability and continuity of development than has been the case in the past. In particular, the apparatus is particularly useful where effervescent liquids are to be metered from a source.

DESCRIPTION OF THE PREFERRED EMBODIMENT

Figure 1:
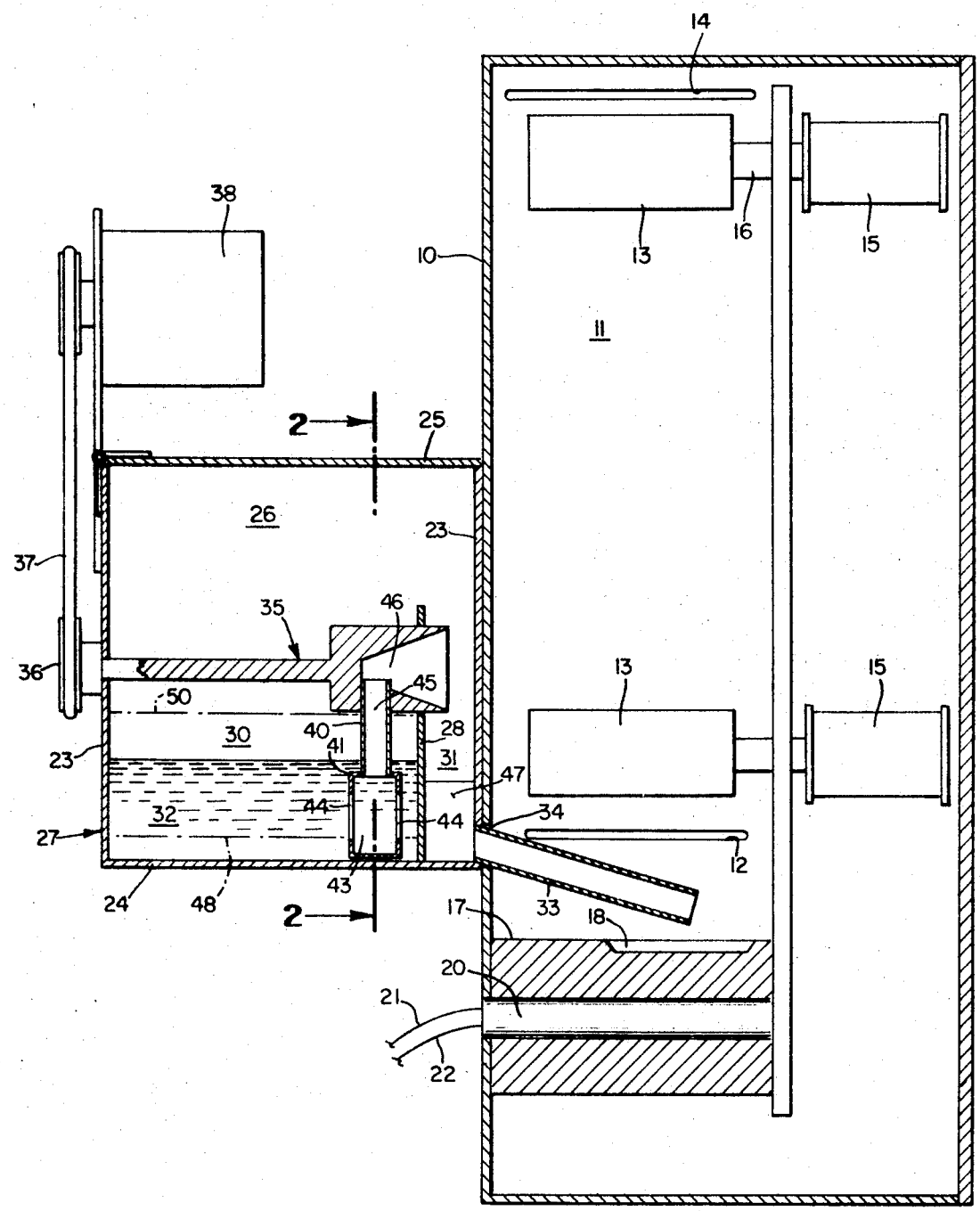
FIG. 1 is a partial sectional side elevation view of apparatus of the present invention illustrating the liquid metering apparatus in combination with other elements of the equipment for developing a diazotype image.
Figure 2:
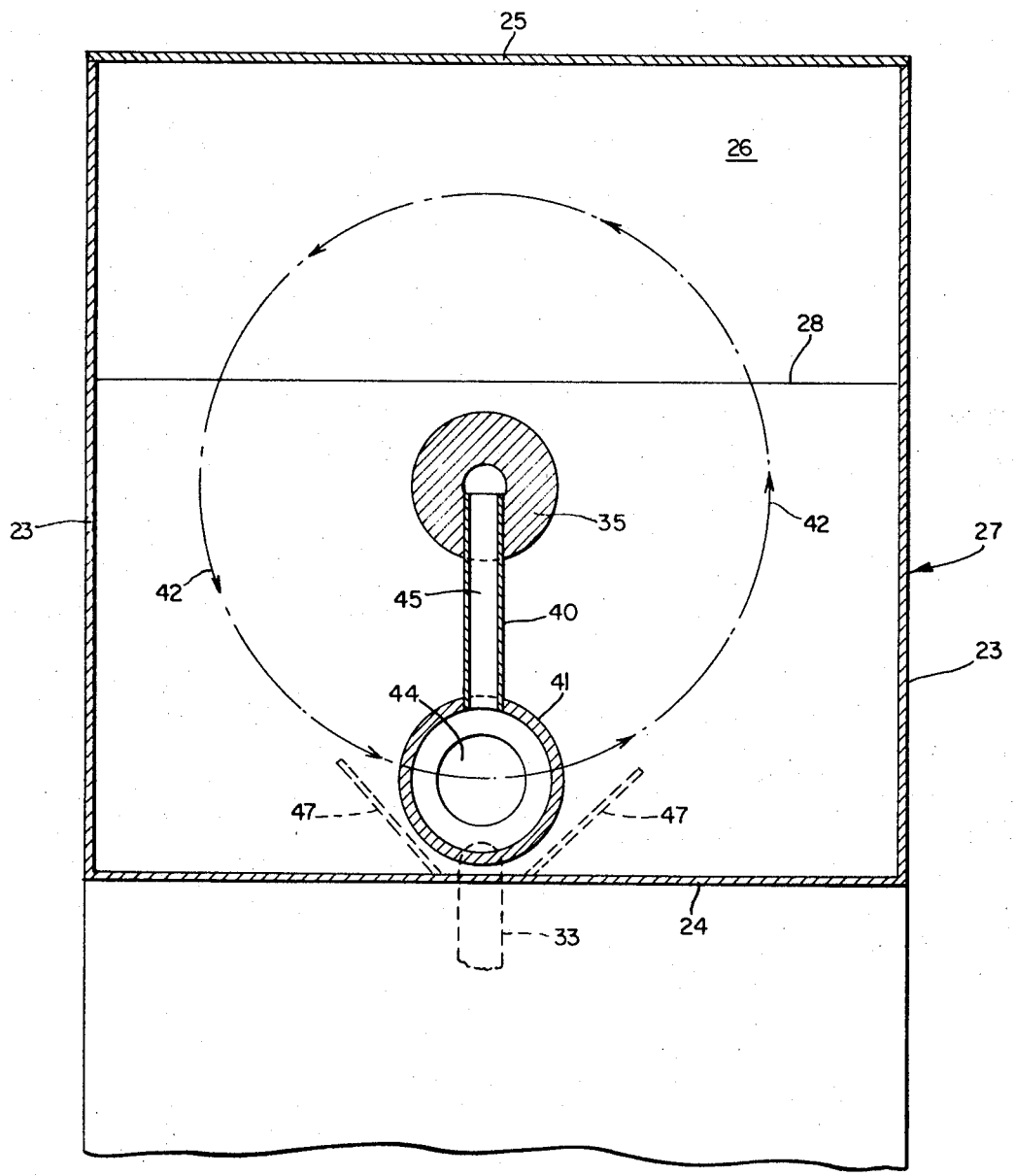
FIG. 2 is a sectional view taken along line 2—2 of FIG. 1.

Referring now to the drawings, a housing 10 defines a development chamber 11 in which diazotype film is developed. The film to be developed has received a light image on its photosensitive surface prior to entering the chamber 11, which forms a latent image to be developed. The latent image is to be developed within the chamber 11 by subjecting it to ammonia under certain conditions of time and temperature well known to those skilled in the art whereupon the image will be rendered visible. The film is fed into the chamber 11 through a slit opening 12 and is festooned over and suspended between a plurality of guide rollers 13 to expose its surface to the atmosphere within the development chamber 11. It is then drawn from the chamber 11 through a further slit opening 14 to be processed and wound. Rollers 13 are driven by motors 15 operating through shafts 16 penetrating the side wall of the housing 10. Alternatively the film may be drawn through the housing 10 by means (not shown) located outside of the housing 10 and the rollers 13 may be the idler rollers.

Development of the image on the diazotype film depends in part upon the vapor pressure of ammonia which is maintained within the chamber 11. Thus, it is important to supplant the ammonia vapor which is lost by development and leakage. This is preferably accomplished by evaporating a given quantity of aqueous ammonia per unit time within the chamber 11. The evaporated ammonia thus prevents the attenuation of the vapor pressure of the ammonia within the chamber below a minimum level.

A tray 17 is provided near the bottom of the housing 10 for receiving aqueous ammonia from a source outside of the chamber 11. The tray 17 provides a cavity 18 for holding the liquid to be evaporated to increase the depleting vapor pressure. Heating means in the form of a resistance element 20 electrically connected to wires 21 and 22 leading to a source of electrical power (not shown), are embedded in the tray 17. Heat from the resistance element 20 is conducted to the liquid in the cavity of the tray.

The liquid metering apparatus of the invention is attached to the side wall of the housing 10. The metering apparatus includes a housing 27 having four side walls 23, a bottom wall 24, and a hinged top wall 25 which permits access to the chamber 26 for inserting the aqueous ammonia or other liquid to be metered. The housing 27 has a partition 28 extending upwardly from the bottom wall 24 and connecting two opposed side walls so as to divide the lower portion of the chamber 26 within the housing 27 into two portions 30 and 31. The portion 30 of the chamber 26 is partially filled with a liquid 32 to be metered by the apparatus. The other portion 31 of the chamber 26 communicates with the interior of the housing 10, that is, the chamber 11 by means of a pipe 33 extending through an opening 34 in a side wall of the housing 10 and through a side wall of the housing 27 at its lowermost point.

The apparatus includes a shaft 35 rotatably mounted in the side wall of the housing 27 and in the partition wall 28. The shaft 35 has a pulley 36 on its through-extending end passing through the side wall of the housing 27. The pulley 36 is driven by a belt 37 connected to a motor 38, the speed of which may be varied by means (not shown) and in a manner well known to those skilled in the art. An arm 40 connects to the shaft 35 and is moved through an orbital path about the shaft 35 as the shaft 35 rotates. The arm 40 carries a dipper 41 on its radially outermost end which is adapted to move through the orbital path indicated by arrows 42 during which it is immersed in the liquid 32 contained in the portion 30 of the chamber 26.

The dipper 41 defines a cylindrical chamber 43 therein having a horizontal cylindrical axis. The dipper 41 has an axially disposed circular opening 44 through each of its end walls; the diameter of each of the openings 44 being smaller than the diameter of the cylindrical chamber 43. In this manner, the dipper 41 defines an annular groove or space which is capable of retaining a predetermined amount of liquid in a cylindrical segment thereof regardless of the location of the dipper along its orbital path.

The amount of liquid retained by the dipper 41 depends upon the diameter of the cylindrical chamber 43, the thickness of the chamber 43, and the diameter of the openings 44 since, upon submerging and withdrawing the dipper from a body of liquid, the excess liquid flows over the edges of openings 44 until only a predetermined cylindrical segment is left filled.

The arm 40 has a passageway 45 therethrough which connects with the annular space in the dipper 41 through an opening in the wall forming the inner cylindrical surface of the dipper 41. The radially inward end of the arm 40 connects with a passageway 46 extending from the end of the shaft 35 to the point where the arm 40 connects to the shaft 35. The end of the shaft 35 is of larger diameter along the portion containing the passageway 46. It will thus be apparent that when the dipper 41 is disposed above the level of the liquid 32 in the reservoir and above the axis of the shaft 35, liquid in the dipper 41 will flow from the annular space through the passageway 45 in the arm 40 and through the passageway 46 in the shaft 35. The passageway 46 in the shaft 35 is tapered radially outwardly toward the end of the shaft 35 from the point where the passageway 45 in the arm 40 interconnects with the passageway 46 in the shaft 35. Liquid from the arm 40 drains from the end of the shaft 35 into the portion 31 of the chamber 26 which connects with the development chamber 11 through the pipe 33.

A pair of inclined guide plates 47 are arranged in the portion 31 of chamber 26 between the partition 28 and a side wall 23 of housing 27. The guide plates channel liquid from passageway 46 toward the opening to the pipe 33.

In operation of the embodiment shown, care should be taken to maintain the level of liquid 32 in the portion 30 of the chamber 26 between the dotted line, indicated by reference numeral 48, and the dotted line, indicated by reference numeral 50. The lower dotted line 48 indicates the level at which liquid is able to flow into the annular space of the dipper 41 when it is disposed in the lowermost point in its orbital path. The upper dotted line 50 represents the level at which liquid contained within the annular space begins to flow into the passageway 45 in arm 40. Obviously, no further liquid should enter the annular space of the dipper 41 through the openings 44 at that point since this would be additive to the predetermined amount of liquid to be fed.

The above description shows that the invention provides apparatus for metering liquid from a reservoir in which the liquid level may vary, which apparatus can be advantageously used in combination with other elements of equipment for developing diazotype film. The apparatus is relatively uncomplicated in construction and operation and eliminates the need for the sensitive control devices such as liquid level devices used in the past. The apparatus is particularly useful in situations where an effervescent liquid is to be metered in that it avoids the vapor locking problems experienced with pumps.

From the above description of the invention, it will be apparent that various modifications in the apparatus described in detail herein, may be made within the scope of the invention. Therefore, the invention is not to be limited to the specific details of the apparatus described herein except as may be required by the following claims.

What is claimed is:

1. In combination in equipment for developing a diazotype film to render visible an image thereon,
a development chamber, means to feed a strip of diazotype film having a developable image thereon into and out of said development chamber, means for maintaining a prescribed minimum vapor pressure of ammonia in said development chamber, said means including liquid evaporator means including heating means disposed in said development chamber, and liquid supply means adapted to feed metered amounts of aqueous ammonia to said liquid evaporator, said liquid supply means comprising a reservoir containing aqueous ammonia;

a dipper adapted to transport aqueous ammonia, said dipper having a cylindrical chamber therein disposed with its cylindrical axis substantially horizontal, and having at least one axially disposed circular opening into said cylindrical chamber, the diameter of said opening being smaller than the diameter of said cylindrical chamber, dipper transport means for cyclically immersing said dipper in the aqueous ammonia in said reservoir, and conduit means connecting said dipper to the liquid evaporator means disposed in said development chamber and adapted to receive aqueous ammonia from said dipper when said dipper is disposed above the surface of aqueous ammonia in said reservoir, whereby a predetermined amount of aqueous ammonia is removed from said reservoir by said dipper when said dipper is withdrawn from the aqueous ammonia in said reservoir after immersion therein.

2. In equipment for developing a diazotype film to render visible an image thereon, the combination according to claim 1, wherein said dipper has two axially disposed circular openings into said cylindrical chamber, said openings being disposed at the respective ends of said cylindrical chamber.

3. In equipment for developing a diazotype film to render visible an image thereon, the combination according to claim 1, wherein said dipper transport means include a rotatably mounted shaft, a motor operably connected to said shaft, and an arm depending radially outward from said shaft and carrying said dipper on its outer end whereby, upon rotation of said shaft by said motor, said arm carries said dipper through an orbital path so that upon each revolution, said dipper is immersed in and withdrawn from the liquid in said reservoir.

4. In equipment for developing a diazotype film to render visible an image thereon, the combination according to claim 3, wherein said arm has an elongate passageway therethrough, one end of which communicates with said cylindrical chamber, and wherein said shaft has a coaxial passageway extending from one end thereof and communicating with the passageway in said arm.

5. In equipment for developing a diazotype film to render visible an image thereon, the combination according to claim 4, wherein said dipper defines an annular chamber for retaining a predetermined amount of fluid in a cylindrical segment thereof regardless of the location of said dipper along its orbital path.

6. In equipment for developing a diazotype film to render visible an image thereon, the combination according to claim 5, wherein the passageway in said arm communicates with said annular chamber through an opening in the cylindrical wall defining said annular chamber, the outer end of said arm terminating at said cylindrical wall.

7. In equipment for developing a diazotype film to render visible an image thereon, the combination according to claim 6, wherein said coaxial passageway in said shaft tapers outwardly toward the end of said shaft from the point where the elongate passageway in said arm interconnects with the passageway in said shaft.

* * * * *